United States Patent [19]
Ackeret

[11] Patent Number: 4,993,178
[45] Date of Patent: * Feb. 19, 1991

[54] DEVICE FOR THE CYCLIC REARRANGEMENT OF A PILE OF RECTANGULAR OR SQUARE SHEETS

[75] Inventor: Peter Ackeret, Kusnacht, Switzerland

[73] Assignee: Licinvest AG, Chur, Switzerland

[*] Notice: The portion of the term of this patent subsequent to Aug. 29, 2006 has been disclaimed.

[21] Appl. No.: 316,500

[22] Filed: Feb. 27, 1989

Related U.S. Application Data

[60] Continuation of Ser. No. 148,966, Jan. 27, 1988, Pat. No. 4,860,473, which is a division of Ser. No. 888,333, Jul. 11, 1986, abandoned.

[30] Foreign Application Priority Data

Nov. 13, 1984 [DE] Fed. Rep. of Germany ....... 3441481

[51] Int. Cl.⁵ ............................................. G09F 11/30
[52] U.S. Cl. ......................................... 40/513; 40/511
[58] Field of Search ................. 40/513, 511, 490, 508, 40/509, 375, 380, 381

[56] References Cited

U.S. PATENT DOCUMENTS

| | | | |
|---|---|---|---|
| 3,495,345 | 2/1970 | Weggeland | 40/490 |
| 3,783,540 | 1/1974 | Barclay | 40/511 |
| 4,057,920 | 11/1977 | Weggeland | 40/513 |
| 4,173,838 | 11/1979 | Antos | 40/366 |
| 4,238,898 | 12/1980 | Ackeret | 40/513 |
| 4,238,899 | 12/1980 | Ackeret | 40/513 |
| 4,241,528 | 12/1980 | Ackeret | 40/513 |
| 4,241,529 | 12/1980 | Baur | 40/513 |
| 4,245,417 | 1/1981 | Ackeret | 40/513 |
| 4,259,802 | 4/1981 | Ackeret | 40/513 |
| 4,376,348 | 3/1983 | Ackeret | 40/513 |
| 4,546,561 | 10/1985 | Ackeret | 40/513 |
| 4,550,516 | 11/1985 | Ackeret | 40/513 |
| 4,754,564 | 7/1988 | Ackeret | 40/513 |
| 4,759,142 | 7/1988 | Ackeret | 40/513 |
| 4,860,473 | 8/1989 | Ackeret | 40/513 |

FOREIGN PATENT DOCUMENTS

| | | | |
|---|---|---|---|
| 2833464 | 2/1980 | Fed. Rep. of Germany | 40/513 |
| 3014394 | 10/1981 | Fed. Rep. of Germany | . |
| 2912941 | 3/1989 | Fed. Rep. of Germany | . |

*Primary Examiner*—James R. Brittain
*Attorney, Agent, or Firm*—Robert R. Jackson

[57] ABSTRACT

The invention relates to a device for the cyclic rearrangement of a pile of rectangular or square sheets, especially a pile (182) of photographic prints, having a first (12) and a second (14) frame part which may be moved relative to one another and parallel to the main plane of the pile, and having a sheet cycling structure that, on movement of the frame parts backwards and forwards, removes an individual sheet (188) from one end of the pile and adds it to the other end of the pile again, this sheet cycling structure comprising:

(a) a separator structure (20, 68, 71) for separating the individual sheet from the pile,
(b) a feeder structure (22) for feeding sheets to the separator structure,
(c) a retainer structure (26, 28, 32, 80) for holding the individual sheet in the first frame part and the remainder of the pile in the other frame part, and
(d) a guiding structure (79) for guiding the separated individual sheet for the purpose of returning it to the other end of the remainder of the pile,
wherein the retainer structure for the individual sheet is a pincer-like arrangement (32/78; 278; 32/288; 266/290) which is arranged, in the direction of movement, after the separator structure (68, 69) and the holding and releasing movements of which can be controlled by the relative movement of the frame parts (12, 14).

37 Claims, 17 Drawing Sheets

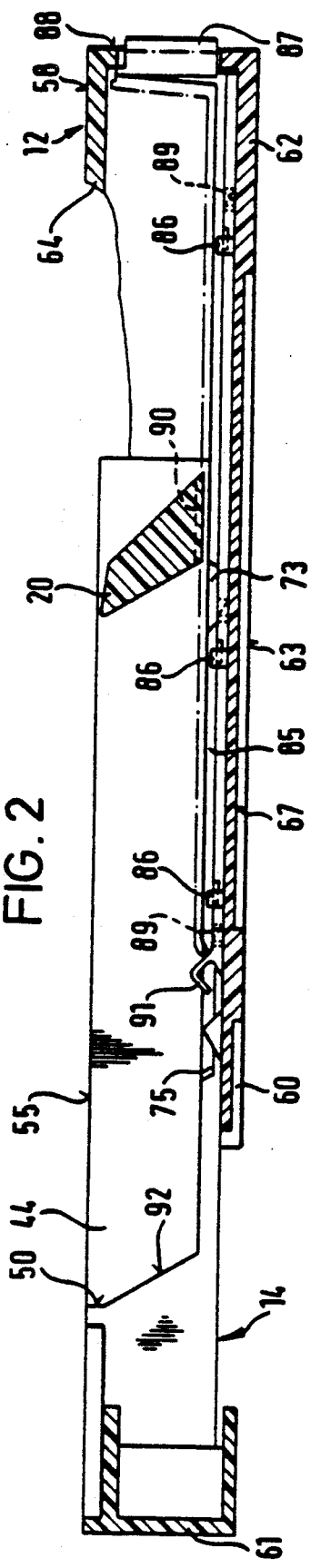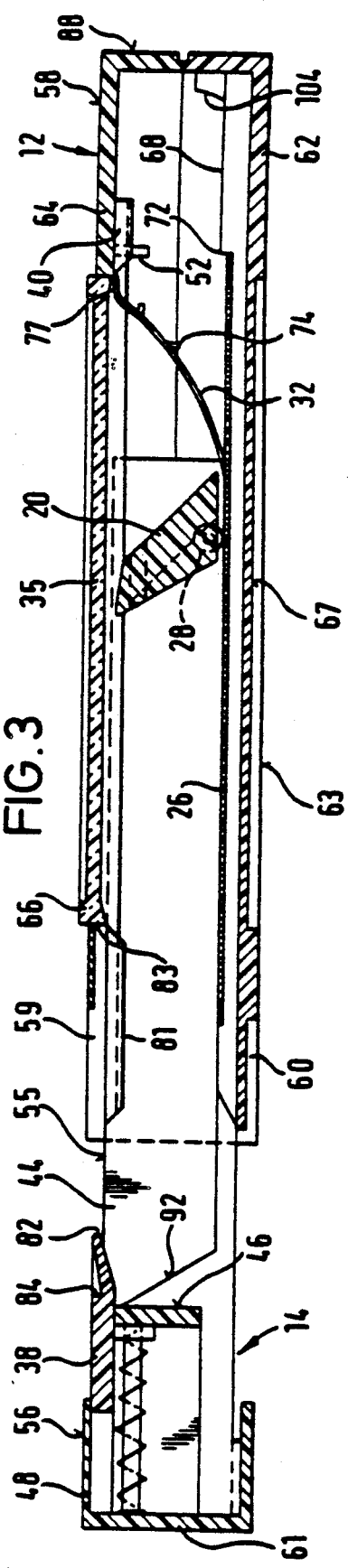

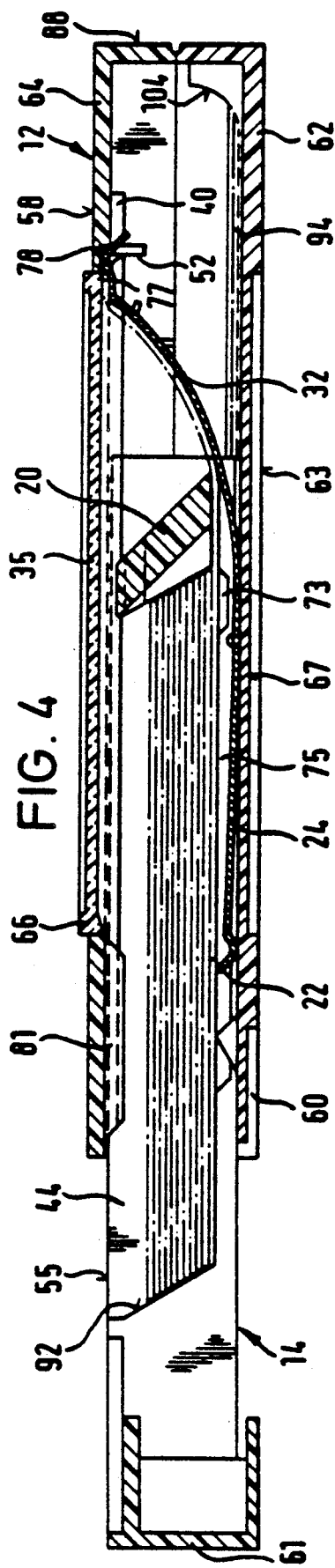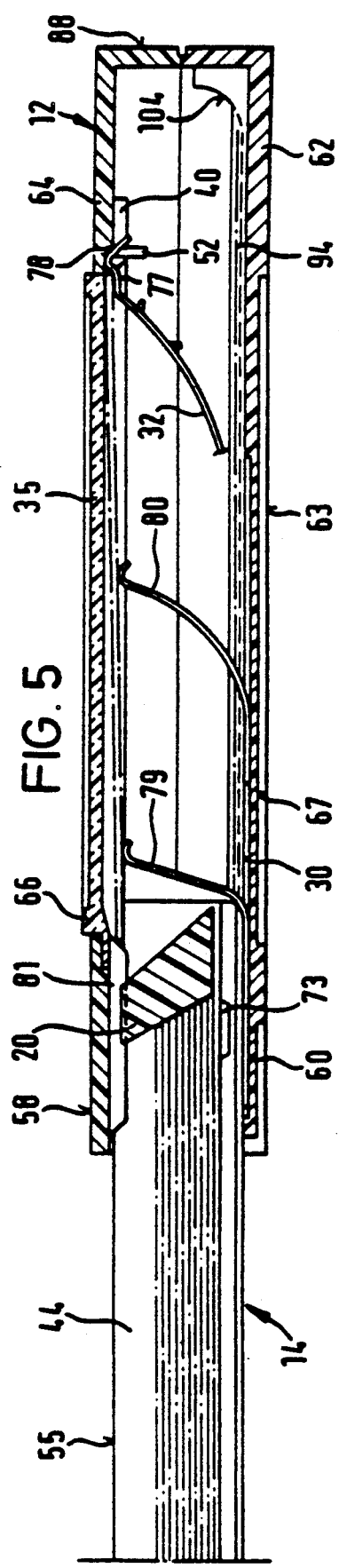

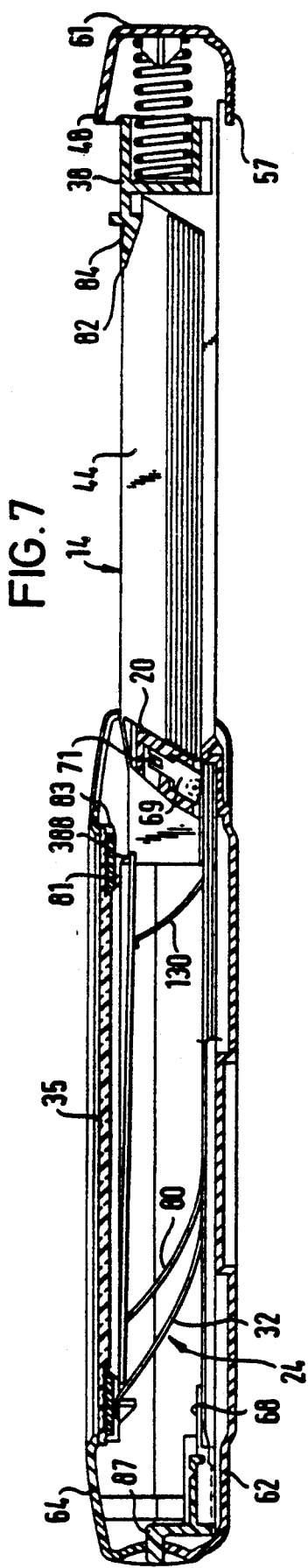
FIG.7
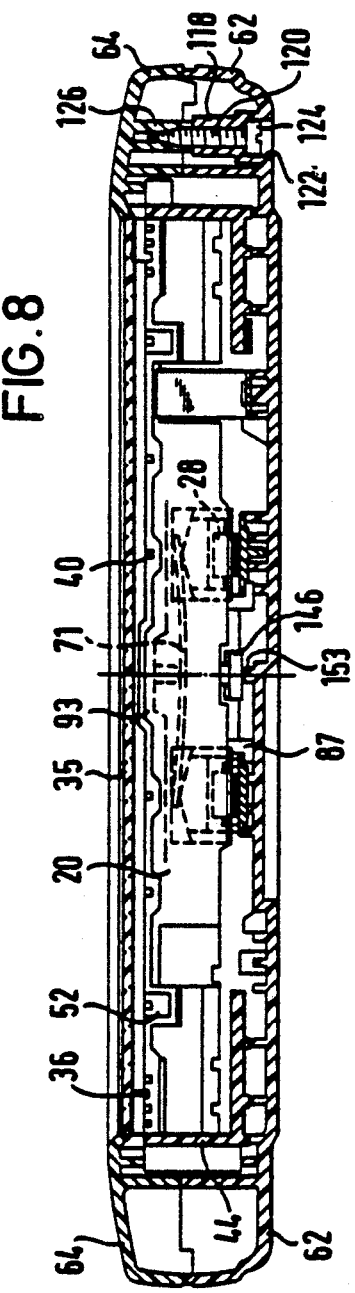
FIG.8
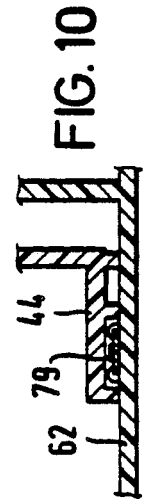
FIG.10
FIG.11
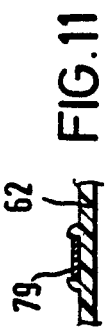
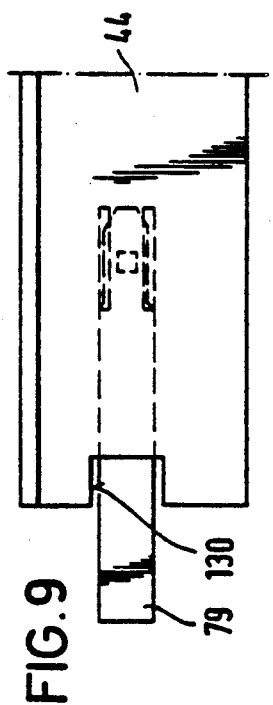
FIG.9

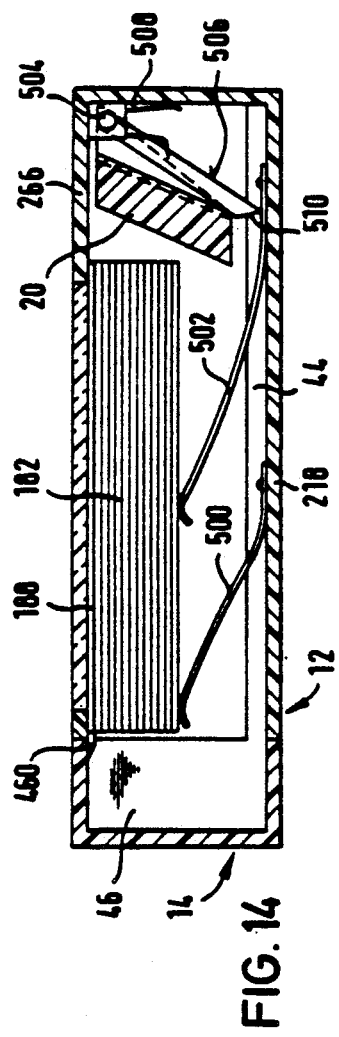
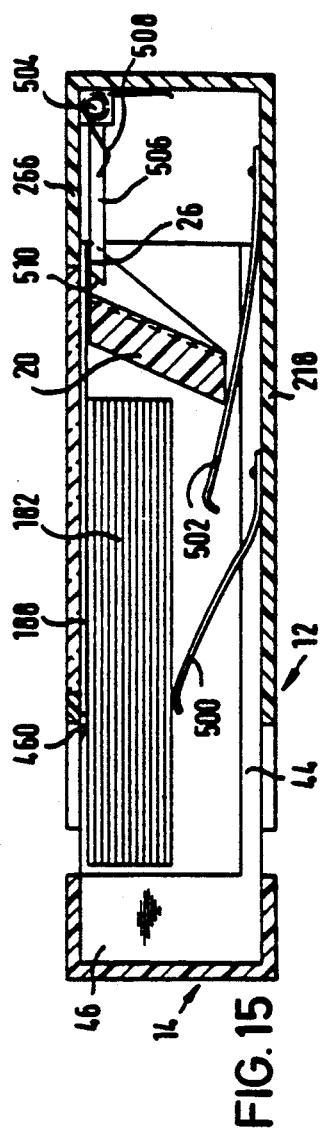
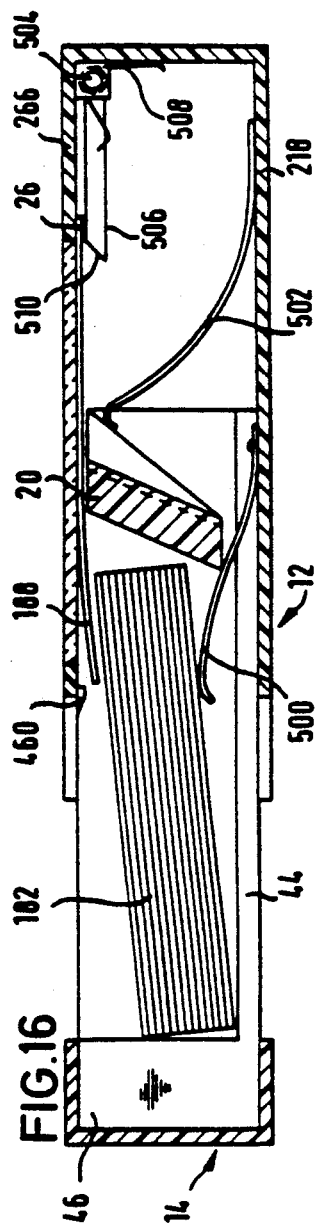

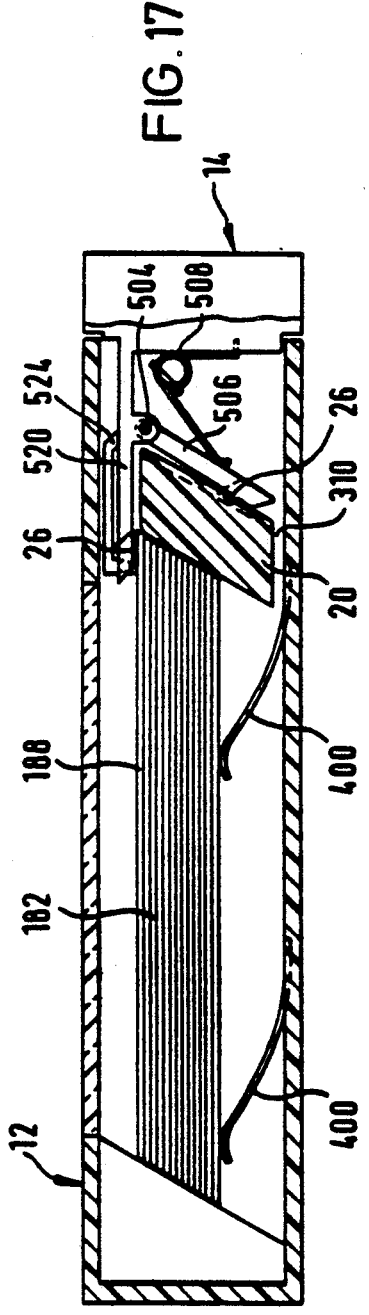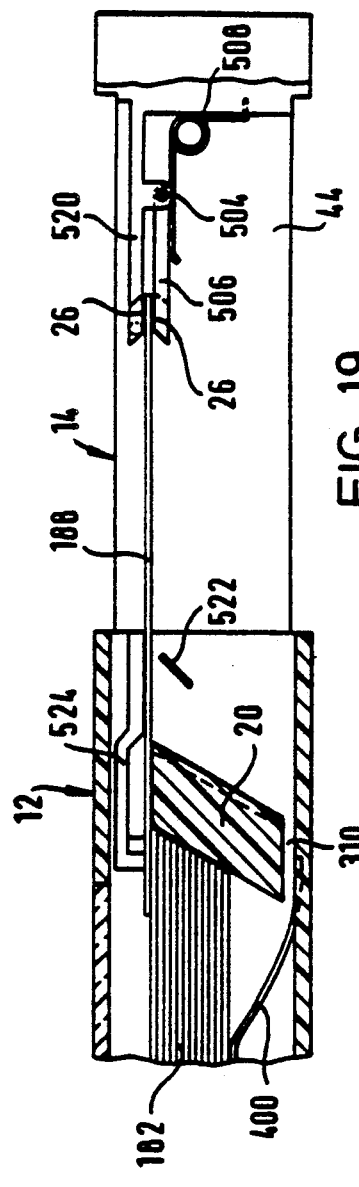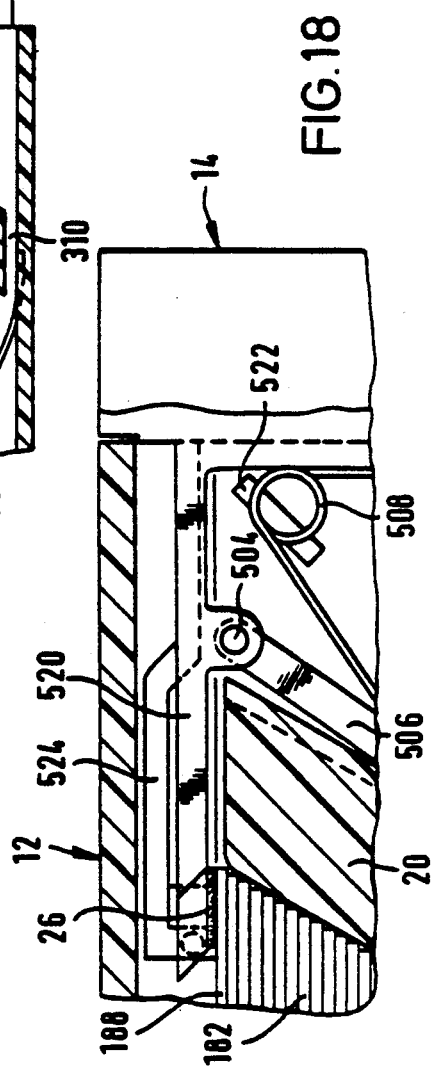

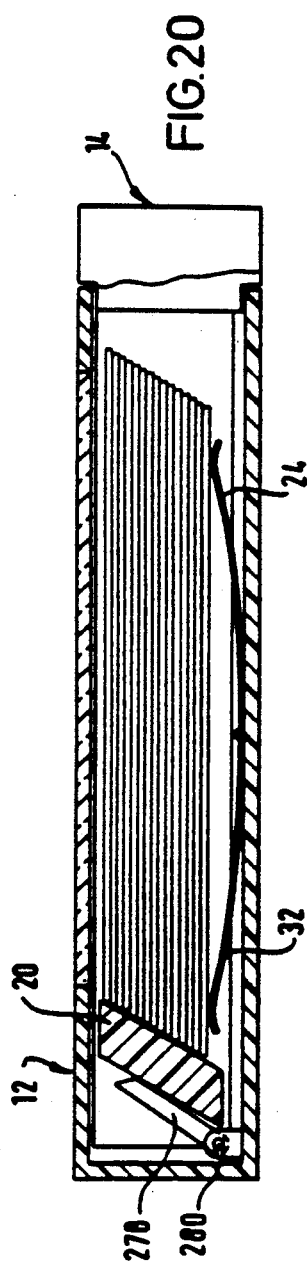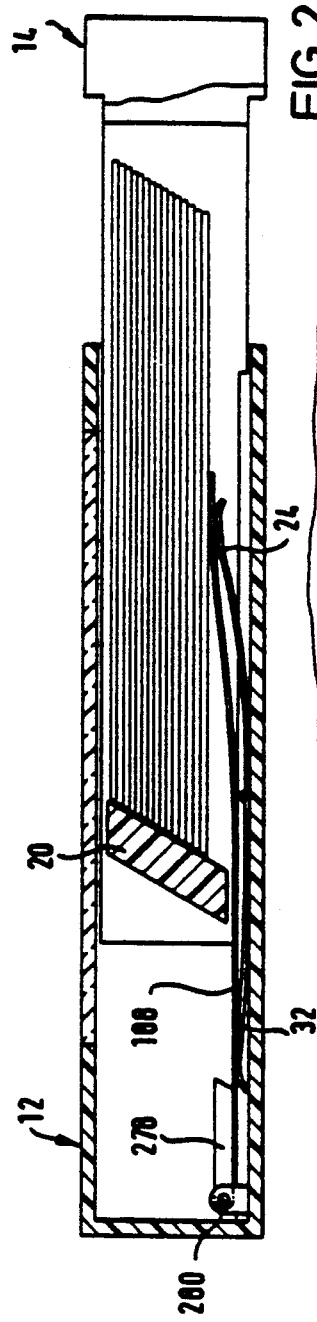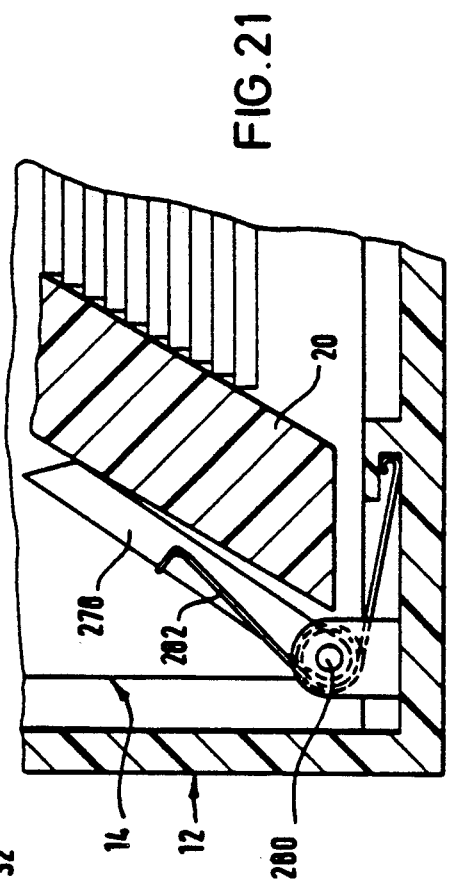

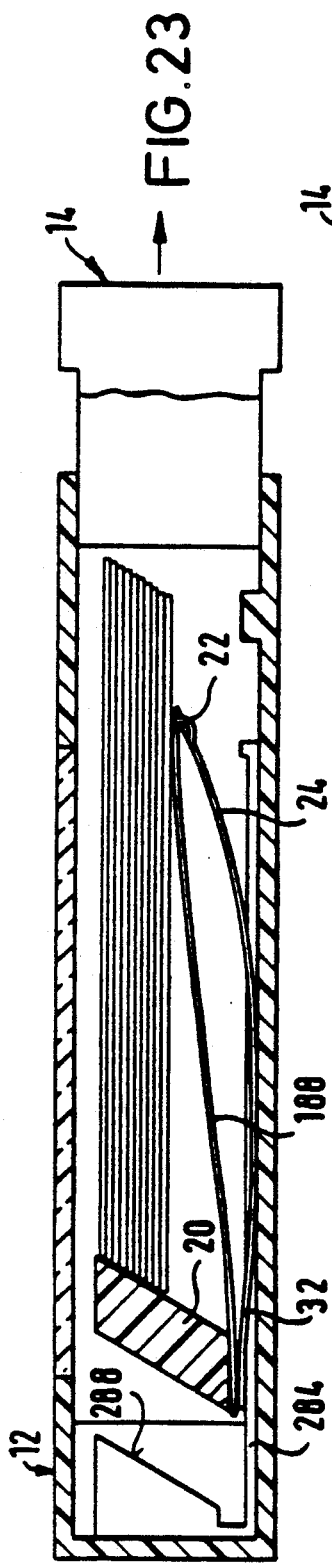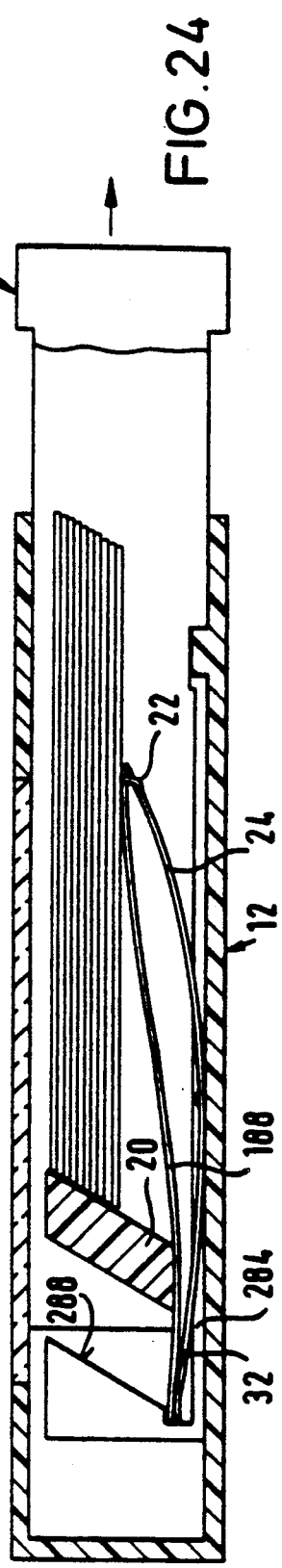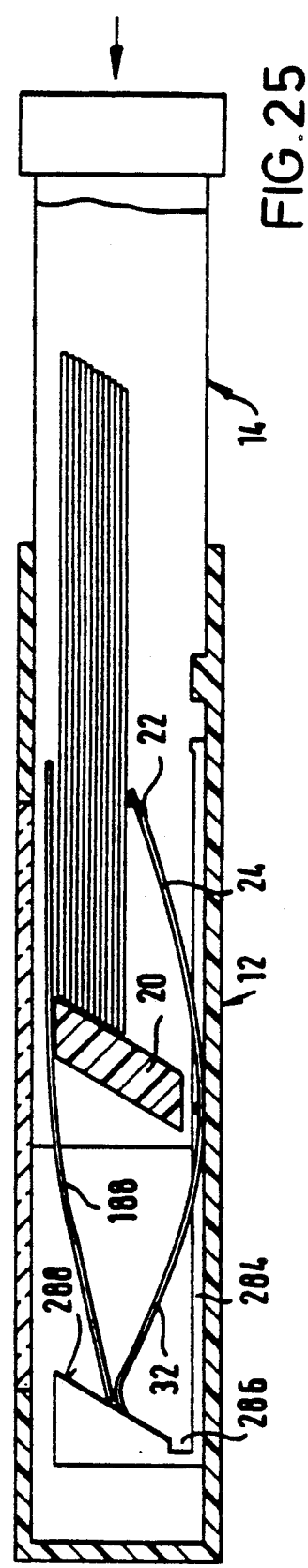

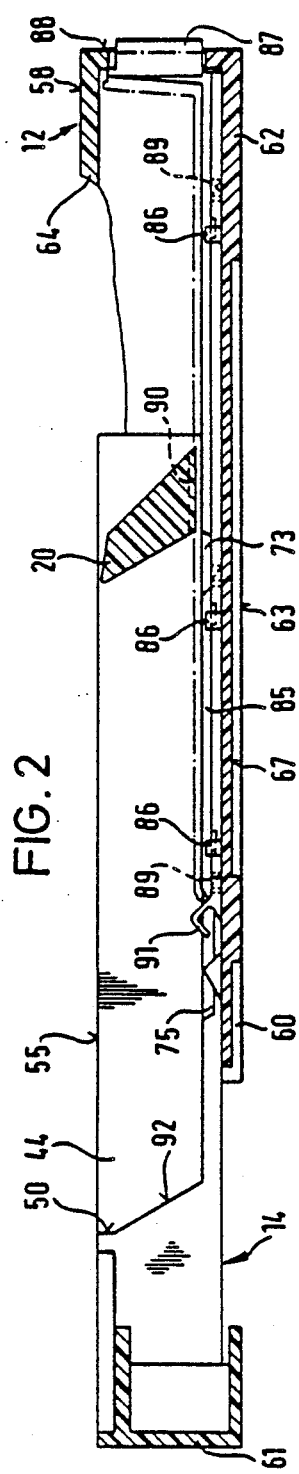
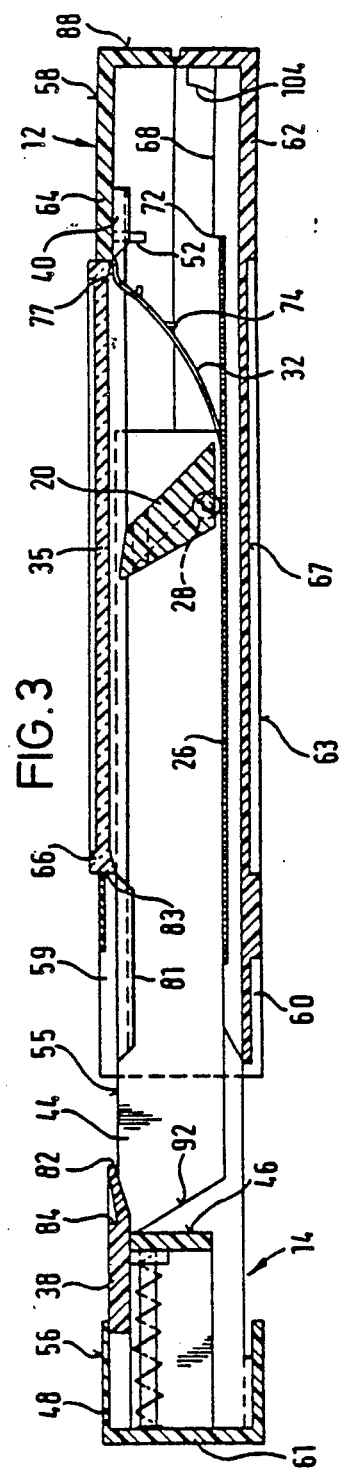

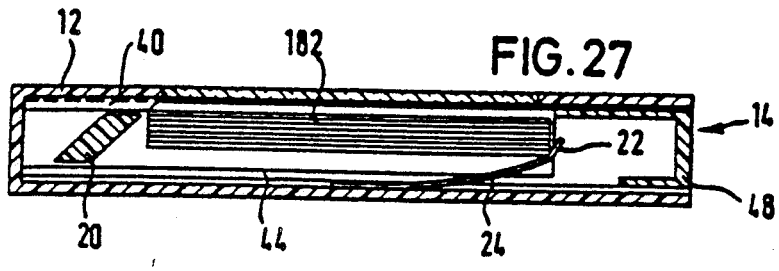
FIG. 27
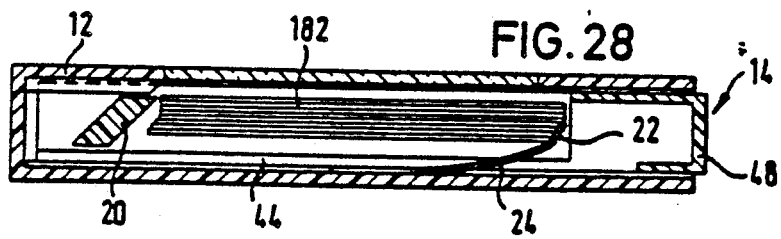
FIG. 28
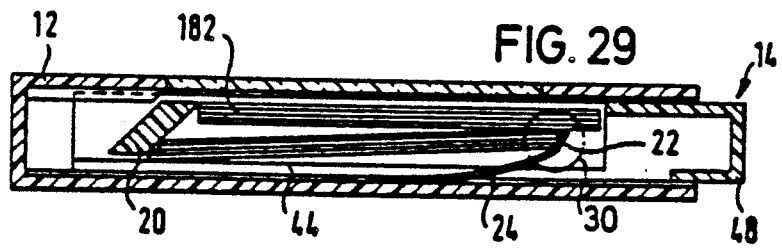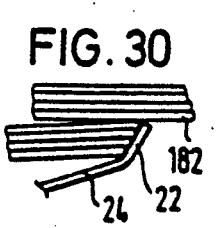
FIG. 29          FIG. 30
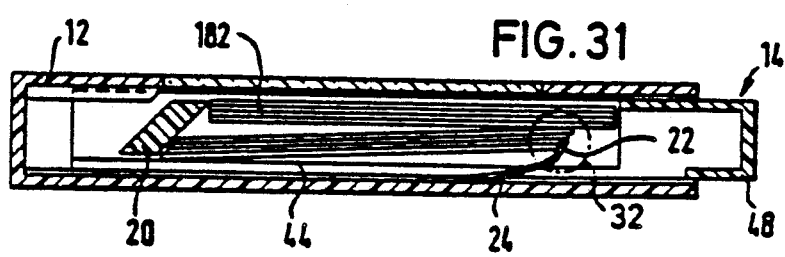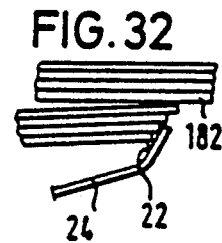
FIG. 31          FIG. 32
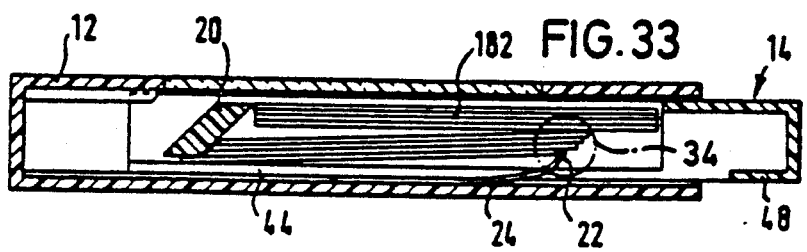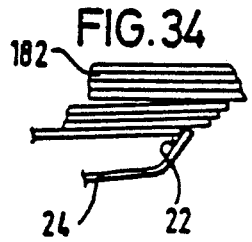
FIG. 33          FIG. 34

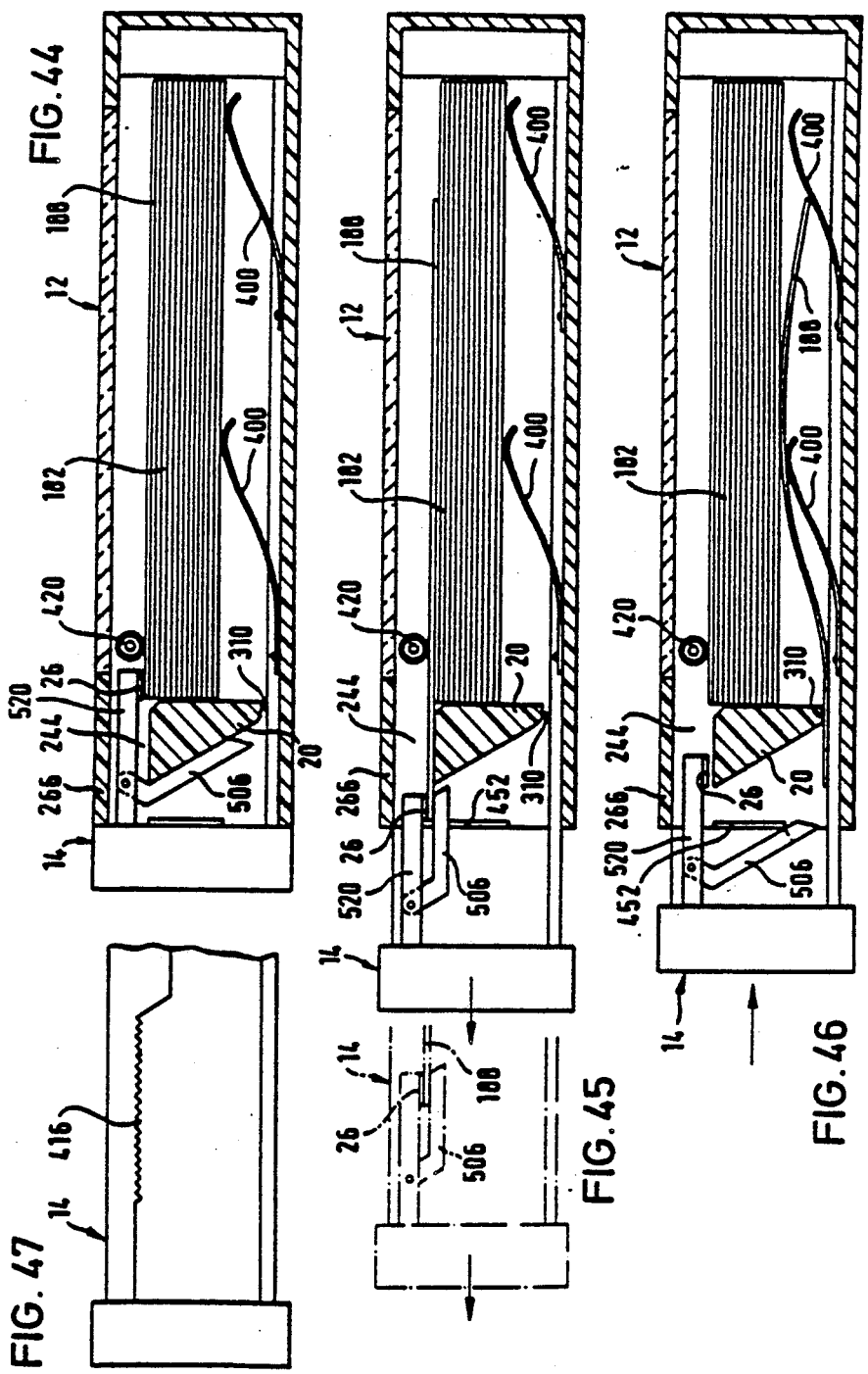

DEVICE FOR THE CYCLIC REARRANGEMENT OF A PILE OF RECTANGULAR OR SQUARE SHEETS

This is a continuation of application Ser. No. 148,966, filed Jan. 27, 1988, entitled "Device for the Cyclic Rearrangement of a Pile of Rectangular or Square Sheets," now U.S. Pat. No. 4,860,473 which was a division of application Ser. No. 888,333, filed July 11, 1986, and now abandoned.

BACKGROUND OF THE INVENTION

1. Field of the Invention

The invention relates to a device for the cyclic rearrangement of a pile of rectangular or square sheets, or a so-called "picture-changer".

2. Description of the Related Art

Picture changers are known from U.S. Pat. Nos. 4,238,898, 4,238,899, 4,241,528, 4,241,529, 4,245,417, 4,259,802 and 4,376,348. These specifications are all based on the principle that a pile of pictures, especially photographic prints, is held by two frame parts that are movable relative to one another, one of which may have a viewing window During each complete cycle of movement of the frame parts, that is, pulling them fully away from each other and sliding them fully back together again, one picture is removed from one end of the pile and returned to the other end of the pile again. The picture changers have the following components for this:

A feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

The known picture-changers use one and the same element both as feeding means and also as retaining means for the individual picture, but owing to the different functions this is less advantageous than using a separate system for each of the functions mentioned.

The aim of the present invention is to provide a retaining means which is especially well adapted to the difficulties associated therewith. That is, where photographs are concerned, the edge of the sheet being separated (which comes free behind the separating means) may, on the one hand, be warped and bowed owing to the thin material and, on the other hand, due to the physical and chemical properties of the photographic papers, require especially strong separating forces.

SUMMARY OF THE INVENTION

According to the invention, there is proposed for solving this problem a device for the cyclic rearrangement of a pile of rectangular or square sheets, especially a pile of photographic prints, said device being provided with a first and a second frame part which may be moved relative to one another and parallel to the main plane of the pile, and with means that, on movement of the frame parts backwards and forwards, remove an individual sheet from one end of the pile and add it to the other end of the pile again, these means comprising (a) a separating means for separating the individual sheet from the pile,
(b) a feeding means for feeding sheets to the separating means,
(c) retaining means for holding the individual sheet in the first frame part and the remainder of the pile in the other frame part, and
(d) a guide means for guiding the separated individual sheet for the purpose of returning it to the other end of the remainder of the pile, wherein the retaining means for the individual sheet is a pincer-like arrangement which is arranged, in the direction of movement, after the separating means and the holding and releasing movements of which can be controlled by the relative movement of the frame parts. Accordingly, use is made, in advantageous manner, of the fact that after the separating means the leading edge of the separated sheet is accessible on all sides and can therefore be held firmly for the transfer even of large forces. This firm holding has proved secure even when the edge is warped and bowed and ensures that no slipping can occur in the plane of the sheet. A further advantage is that, considered spatially, the feed system can be arranged on one side of the separating means and the retaining system on the other side so that no problem can arise from the fact that a component forming simultaneously the feeding and retaining means has to "cross through" the separating means.

It should be noted that, in addition to this actual function, the retaining means according to the invention may also assume at least some of the functions of the guide means. For example, it can secure the individual picture in its position at least during a portion of the return movement of the frame parts, so that, for example, it cannot rotate in its own plane.

Embodiments of the subject of the invention are explained in detail below with reference to the accompanying drawings.

BRIEF DESCRIPTION OF THE DRAWINGS

Firstly, an embodiment shown in FIG. 1 to 5 is explained in detail. A further embodiment is shown in FIGS. 6 to 13 and is also described in detail. FIGS. 14 to 26 show, to a large extent schematically, concepts, alternatives and details of the controlled, pincer-like retaining means. There may cooperate therewith differently designed feed systems which are shown, to a large extent schematically, in FIGS. 27 to 47.

The manner of representation of the figures, longitudinal or cross-section, plan view or partial perspective, etc., is clear per se to the person skilled in the art or is given during the description of each Figure. In addition, the person skilled in the art can supplement the Figures using his knowledge of the first two embodiments. In particular

FIG. 2 is a partial longitudinal sectional view taken along the line 2—2 in FIG. 1.

FIG. 3 is a longitudinal sectional view taken along the line 3—3 in FIG. 1.

FIG. 4 is a longitudinal sectional view taken along the line 4—4 in FIG. 1.

FIG. 5 is a partial longitudinal sectional view taken generally along the line 5—5 in FIG. 1 but showing a different stage in the operating cycle than is shown in FIG. 1.

FIG. 7 is a longitudinal sectional view taken along the line 7—7 in FIG. 6.

FIG. 8 is a transverse sectional view of the apparatus of FIG. 6.

FIG. 9 is a plan view of a portion of the apparatus of FIG. 6.

FIGS. 10 and 11 are transverse sectional views of portions of the apparatus of FIG. 6.

FIG. 14 is a simplified longitudinal sectional view of another embodiment of the invention.

FIGS. 15 and 16 are views similar to FIG. 14 showing successive stages in the operating cycle of the FIG. 14 apparatus.

FIG. 17 is a simplified longitudinal sectional view of another embodiment of the invention.

FIG. 18 is an enlarged view of a portion of FIG. 17.

FIG. 19 is a partial view similar to FIG. 17 showing another stage in the operating cycle of the FIG. 17 apparatus.

FIG. 20 is a simplified longitudinal sectional view of another embodiment of the invention.

FIG. 21 is an enlarged view of a portion of FIG. 20.

FIG. 22 is a view similar to FIG. 20 showing another stage in the operating cycle of the FIG. 20 apparatus.

FIG. 23 is a simplified longitudinal sectional view of another embodiment of the invention.

FIGS. 24 and 25 are views similar to FIG. 23 showing successive stages in the operating cycle of the FIG. 23 apparatus.

FIG. 26 is a simplified longitudinal sectional view of another embodiment of the invention.

FIG. 27 is a simplified longitudinal sectional view of an embodiment of the invention.

FIGS. 28, 29, 31, and 33 are views similar to FIG. 27 showing successive stages in the operating cycle of the FIG. 27 apparatus.

FIGS. 30, 32, and 34 are enlarged details of portions of FIGS. 29, 31, and 33, respectively.

FIG. 44 is a simplified longitudinal sectional view of another embodiment of the invention.

FIGS. 45 and 46 are views similar to FIG. 44 showing successive stages in the operating cycle of the FIG. 44 apparatus.

FIG. 47 is a detail of a portion of the apparatus of FIG. 44.

DESCRIPTION OF THE PREFERRED EMBODIMENTS

FIGS. 1 to 5 relate to a first embodiment which is described in detail hereinafter with all components cooperating.

Figure 1:
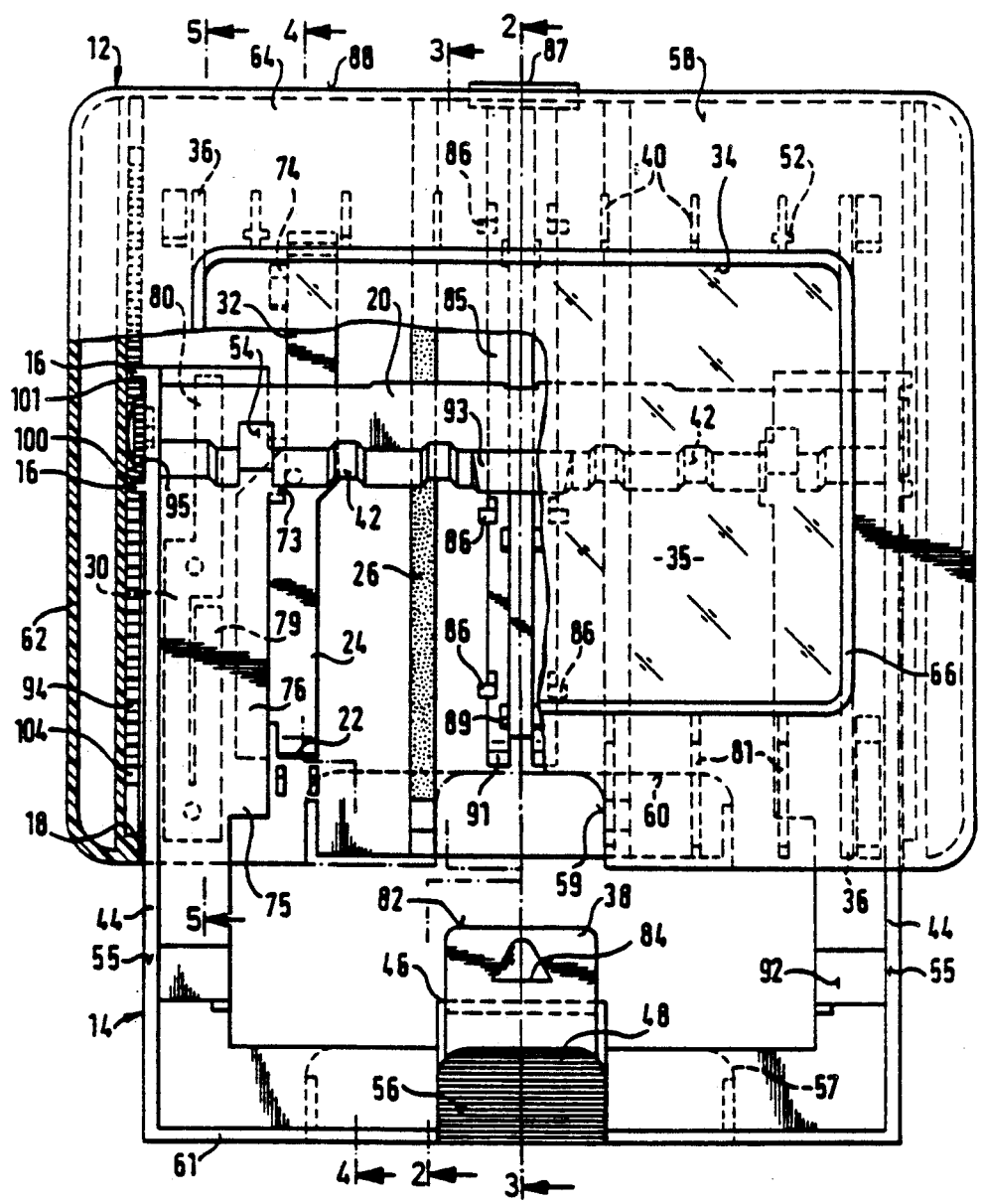
FIG. 1 is a plan view, partly in section, of a first embodiment of the invention.

FIG. 1 shows in a plan view, partially cut away, a device according to the invention. The first frame part is designed as a housing 12, the second frame part is a slider member 14 which can be pulled out of the housing for a distance limited by stop members 16 on the slider member and complementary stop members 18 on the housing and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing on the one hand by the co-operation of rails, arranged fixedly in the housing and provided with a retentive coating 26, with rollers 28 that hold the individual picture firmly against the rails and are caused to rotate as a result of contact with the rails; on the other hand retaining means controlled by the movement of the frame parts are provided. Finally, the guide means is embodied by pairs of leaf springs 30 and the spring arms 32 formed integrally with the spring arms 24.

In the inserted state of the slider member, the spring arms 24 and 32 press the pile of sheets (not shown in FIG. 1) against a viewing window 35, the inner border of which is denoted by 34. The sheet which is then uppermost in the pile, in a specific case a photographic print, is intended to lie as flat as possible; to that end, at its periphery it is supported in a plane that is defined by lateral ribs 36, by the underside of a slidable catch 38 and, at the opposite end, by ribs 40 molded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 molded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, and the ribs 40 on the other.

The grip part 48 has a top part 56, arranged on the window side of the housing, and a bottom part 57 which is wider than the top part; the top wall 58 of the housing surrounding the window in the manner of a frame has a cut-out 59 in the region of the top part, whilst the opposing housing wall is recessed at 60 in a complementary manner for the bottom part 57. Accordingly, in its closed state the device has a closed, substantially rectangular outline without any protruding parts.

The housing and the slider member are injection-molded plastics parts. The slider member is a one-piece element, comprising side-pieces, separator bar, grip part and a front wall 61 joining the grip part to the side pieces, which are of L-shaped cross-section.

Figure 6:
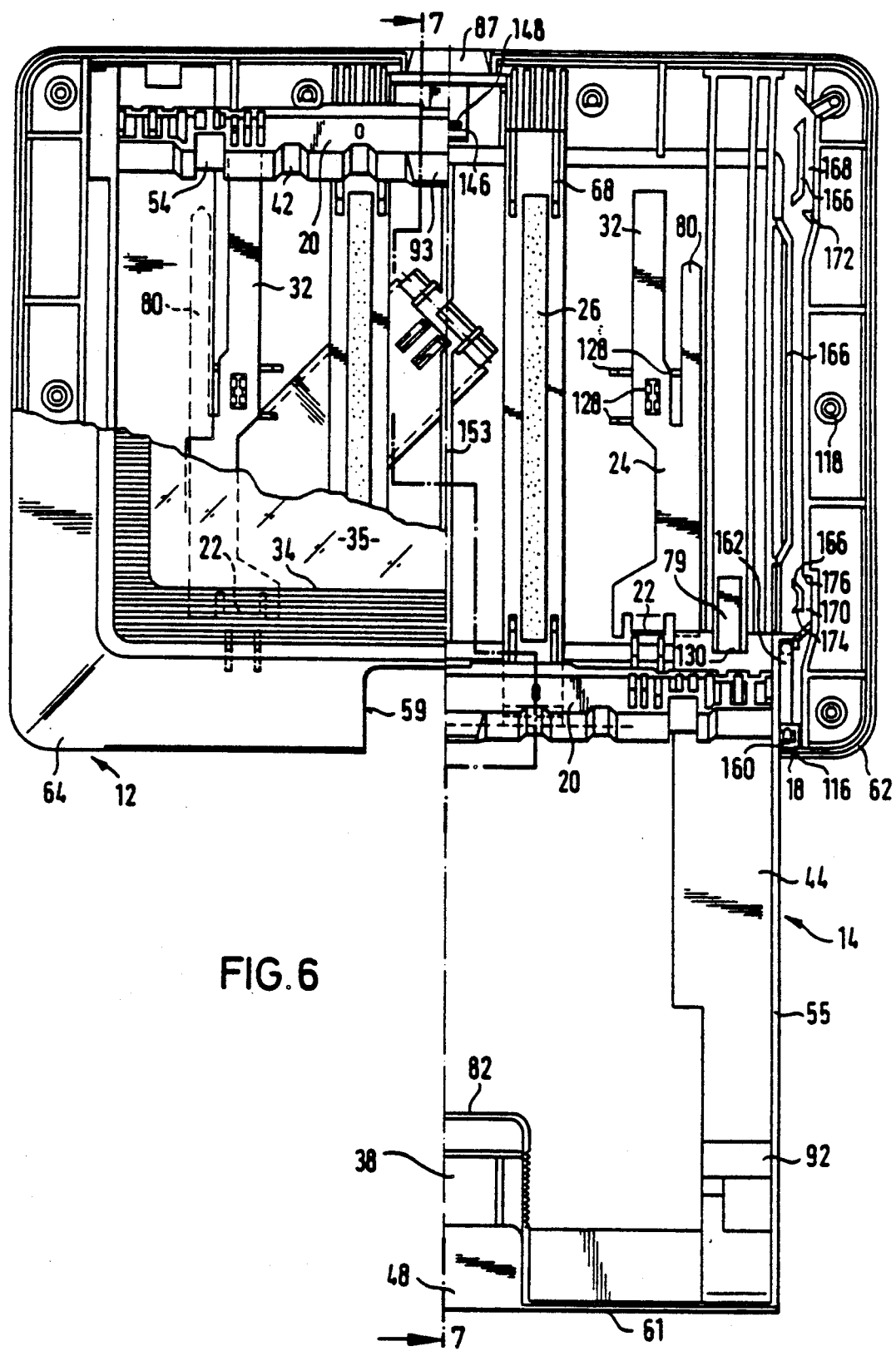
FIG. 6 is a partial plan view, partly in section, of another embodiment of the invention.
Figure 12:
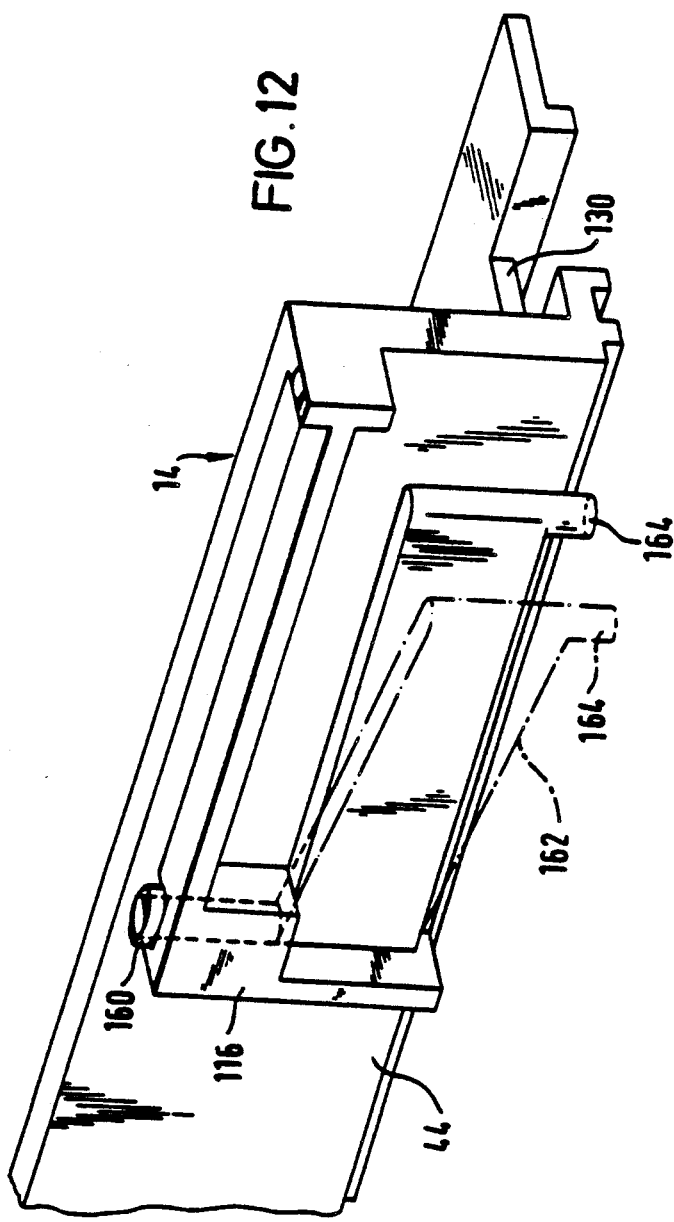
FIG. 12 is a perspective view of a portion of the apparatus of FIG. 6.
Figure 13:
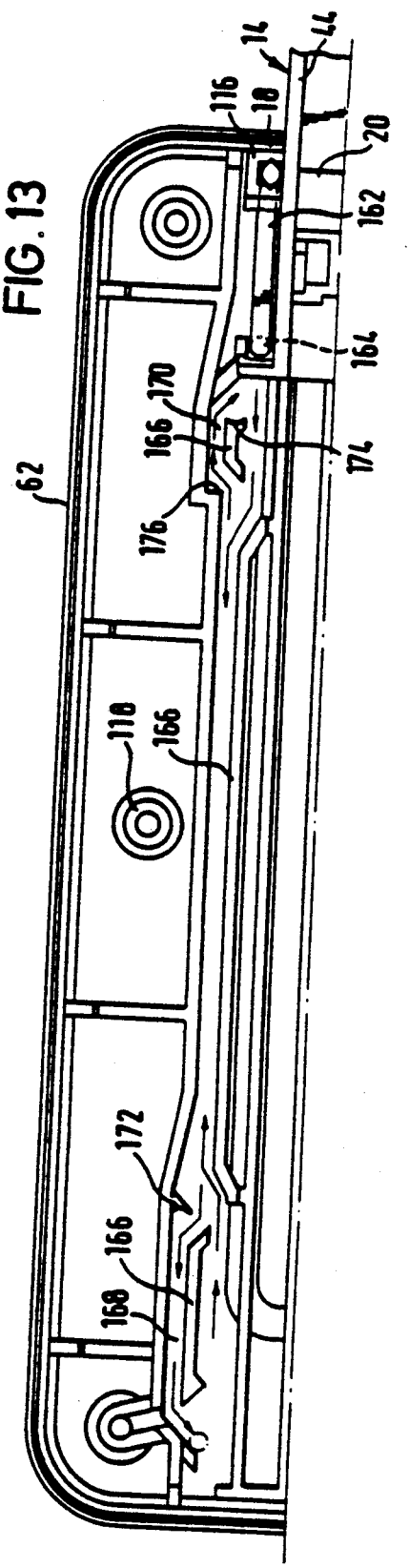
FIG. 13 is a plan view of a portion of the apparatus of FIG. 6.

The housing is composed of three parts: the bottom shell 62 providing the floor 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window 35 has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-slot which is defined, firstly by (in the embodiment) two lands 68 molded on the base of the housing on the inside and, secondly, by the underside of shoes 69 that oppose the lands, the shoes being inserted into the separator bar.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biased by an inserted wire spring 71 Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lower-most in the pile) to be able to enter the slot forming between the shoes 69 and the retentive coatings 26, for as long as this slot is held open by the land 68 as will be explained All the other photographs transported with the hook-like member 22 come up against the separator itself or against the shoes thereof with the result that the hook-like members slip off the end edge of the photographs.

When the rear edges (in the withdrawal direction) of the shoes 69 have passed the edge 72 of the lands 68, the shoes drop under the action of the wire spring, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken that the separator bar also runs over the spring arms 32. So that they do not stress the separated picture from below during the passage of their ends acting on the pile, during a certain phase of the withdrawal movement they are pressed mechanically towards the housing floor. Spring-depressor members 73 molded on the slider member side pieces 44 are used for this purpose; these spring-depressor members pass over projections 74 extending laterally from the spring arms and hold the arms corresponding to their length for a part of the withdrawal movement. Further spring-depressor members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its trailing edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5. The spring arms 32 thus form with the housing top wall a pincer-like arrangement for holding the separated sheets during the remainder of the withdrawal of the slide member.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the change-over operation without becoming twisted even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The complete separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the housing floor.

At the start of the return movement of the slider member, the individual photograph is held by the spring arms 32 in front of the stop members 52 molded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biased by a spring towards the housing, as readily recognizable from FIG. 3. As the slider member is inserted, the free edge 82 of the slidable catch strikes against a stop member 83 provided in the housing, as a result of which the slidable catch is pushed back into the grip part and does not project into the space visible through the housing window Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing It is not possible, or only possible with difficulty, to remove this from the device. In order to be able to remove the pile even when this consists of one picture only, a special arrangement is therefore provided.

A control bar 85 is slideably mounted in the housing, held by retainers 86 molded on the housing. The bar carries an actuating or control key 87 which passes through the rear wall 88 of the housing and projects slightly beyond the outline of the change-over device. By applying pressure with the finger to the key, the bar runs on wedge-like guide members 89 on the housing floor and is thereby lifted towards the window. The width of the bar fits exactly into a complementary recess 90 in the separator and blocks, for the entire withdrawal movement of the slider member, the throughslot of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the change-over operations it does not come into contact with the surface of the picture, causing scratch damage to occur. There is still this danger, however, because the photographs are not always flat, but generally speaking are bowed either in the longitudinal or in the transverse direction. In the case of bowing in the longitudinal direction, the ribs 36 effective for the entire withdrawal movement are sufficient. In the other case, however, the slidable catch is effective but the opposite portion of the separator bar would hardly be able to absorb the considerable stresses which occur in a relatively thick pile of similarly bowed photographs.

For this reason the following measures are taken in addition:

Beneath the stop faces 50 the front wall of the slider member therefore has, near the side pieces, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the center of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again This is effected by means of a blocking mechanism for the change of direction. Molded onto the housing there is a toothed rack 94 with which a pinion 95 meshes, the pinion being integrally-formed with its shaft 96. The shaft fits in a slot running parallel to the rack in the side piece 44 of the slider member, in which slot it is pressed and held by means of a small leaf spring, molded onto the pinion, and resting against the housing.

The slot is divided by means of a rib into two parts, in which the shaft 96 has only a little lateral play. Finally, molded onto the slider member on both sides of the slot there are locking lugs 100, 101 which lie in the plane of the toothed circumference of the pinion and the points of the lugs are engageable with the latter.

It is important to note that over the first part of the withdrawal travel of the slider member the retaining means is indeed embodied by the rollers 28 in conjunction with the retentive coatings 26, but over the last part of the travel, before the end position is reached, the spring arms 32, by firmly holding the individual photograph, also act as a pincer-like retaining means.

As is apparent from the preceding explanation, each rearranged sheet is never released during the whole changeover cycle, but is held at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-center, does not present itself with its edge in the field of view. The same applies to the ribs 36, and just the same considerations apply to the spring arms 79 and 80 and especially to all components engaging with the sheet surfaces.

In FIGS. 6 to 8, the embodiment is illustrated in its totality. The slider member 14 is housed in the housing 12 so that it can slide; the housing 12 forms the first frame part, and the slider member 14 the second. The withdrawal travel is limited by means of a bearing eye 116 which is molded onto one of the side pieces 44 of the slider member and runs onto a stop member 18 in the housing. The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case molded-on guide sleeves 118 for screw shanks 120 and also recesses 122 on the outside for screw heads 124, while the upper shell carries for this purpose coaxially molded-on bushings 126 in which the screws cut their own thread. The window 35 is clipped into the upper shell 64 and the parts of the upper shell lying beneath its outer border areas are not visible, owing to the fact that these areas of the window are frosted. In FIG. 6 the outline of the central transparent portion of the window is marked by 34.

With regard to operation, there are few differences compared with the example of execution according to FIGS. 1 to 5, so that it is sufficient to explain only the significant deviations.

In this case the spring arms 24, 32 and 80 are combined into a stamped and bent part, positioned by means of projections 128 and fixed by crimping without the application of heat. The spring arms 79, however, are separate components which are positioned on the bottom shell by means of molded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 80, which bear the extreme edge of the picture remote from the slider member upwards like a bracket.

In certain circumstances, the retentive coating 26 may hold the separated picture so firmly that the force of the spring arms 79 is not sufficient to lift up the edge of the picture facing towards the slider member with the result that auxiliary springs can be provided in order additionally to push this edge away from the retentive coating.

The bars 134 at the same time form the guide for the control key 87 arranged in the plane of symmetry. The control key 87 carries a projection 146 which points towards the separator bar 20 and has an incision 148, to complement which there is a double-faced projection on the underside of the separator bar 20. If the control key 87 is now pressed while the slider member is held firmly, its projection 146 springs out in a downward direction until the double-faced projection locks into the incision 148. The locking lug projecting downwards from the projection 146 now blocks the separating means for the edge of the bottom picture in the pile, so that when the slider member is pulled, the hook-like members 22 slide away from the edge of this picture also when the separator bar together with the control key 87 acts on the edge of the pile nearest to it and takes the pile along with it. A rib 153 there prevents the disengagement of the projection 146 which runs along on the rib 153. Near the outer end position of the slider member 14, the locking lug meets a recess in the rib 153, while the control key guide lugs run onto a stop member. The projection can accordingly spring out downwards when the slider member is pulled further, and thus release itself from the separator. When the slider member 14 is pushed in again, the control key is freely movable, so that the double-faced projection simply pushes the key in front of itself, until the key has reached its end position again.

The blocking means for the change of direction have already been described above. In the present example of execution, blocking means are also provided, but they act only in the "critical" phases of the changeover cycle.

In the bearing eye 116 of the slider member 14 there is pivotably arranged about a journal 160 a control pawl 162 which is guided by a control projection 164 along channels which are defined by guide rails 166 formed on the bottom shell 62, so that the control projection 164 has to follow the path marked by arrows in FIG. 27 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position the control projection hits either the stop member 174 or the stop edge 176. It should be noted that the journal 160 is seated in the bearing eye with a degree of friction such as to allow the control pawl to follow the guide bars without any noticeable hindrance, but not to be able to swing freely.

From the above explanations it can be understood that as pincer-like retaining means each spring arm 32 cooperates with the top wall of the housing; in the embodiment according to FIGS. 6 to 13, there is a second pincer-like clamp formed by the spring arms 80 in cooperation with the top wall of the housing.

FIGS. 14 to 26 show firstly, in FIGS. 14 to 16, the basic principle of a retaining pincer-like arrangement. FIGS. 17 to 26 show modifications and details.

In FIGS. 14 to 16 the first frame part is designed as a housing 12, and the second frame part as a slider member 14. There is attached, for example molded, to the top wall of the housing 12, a transporter in the form of a ledge or a hook 460 and the side pieces 44 of the slider member are connected at right-angles to one another on the one hand by the stop face 46 of the slider member and on the other hand by a separator bar 20. There is secured to the base wall 268 of the housing a first pressure spring 500 which presses the end of the pile 182 nearest the stop face 46 of the slider member against the top wall of the housing, which may have, for example, a viewing window, and a second pressure spring 502 is also secured to the base of the housing and presses the pile upwards close to its end facing the separator bar.

On the side of the separator bar remote from the pile, a lever 506 is hinged so that it can pivot about an axis 504, which lever is biased by a spring 508 into the position shown in FIG. 15. When the slider member is pushed into the housing, the inclined face 510 at the free end of the lever 506 comes into contact with the side of the separator bar facing it and is pressed downwards by a camming action into the position shown in FIG. 14. The side of the lever 506 facing the top wall of the housing has a retentive coating 26 near its free end.

The device operates as follows:

If, starting from the rest position according to FIG. 14, the slider member 14 is pulled out of the housing 12, the transporter 460 strikes the edge, facing it, of the sheet 188 to be separated and pushes the latter in the direction of the separator bar. This is possible if the pile is held against the top wall sufficiently firmly by the spring 500. As soon as the separator moves outwards, the lever 506 begins to pivot upwards under the action of its biasing spring, it being possible for this to happen without interruption, because the side of the separator bar facing it has a correspondingly deep passage (shown by a dashed line) in the region of the retentive coating.

As soon as the lever has reached the position indicated in FIG. 15, it holds the sheet 188 against the top wall of the housing; as can be seen especially in FIG. 16, the transporter is not, in fact, in a position to hold the sheet against the housing during the entire travel because the spring 500, onto which the separator bar runs, is pressed downwards so that the rear end of the pile, seen in the feed direction, becomes free. On the side of the separator bar remote from the pile, the bar is provided with wedge portions 512, the slope of which is such that when the slider member is pushed back in again, the ends of the spring 502 are pushed downwards and can slide through under the separator.

FIGS. 17 to 19 show, to a large extent diagrammatically, a cross-section, seen from the side, of a further embodiment having the frame parts pushed together in the rest position The first frame part is in the shape of a slider member 14 which can be pulled out of the second frame part in the form of a housing 12. The separating means in the form of a separator bar 20 is arranged fixedly in the housing and a spring assembly 400, likewise arranged fixedly in the housing, presses the pile 182 upwards. The end face, lying closest to the separator bar, of the topmost sheet lies under a retentive coating 26 which is arranged on a first jaw or clamping member 520 of a pincer-like arrangement. This jaw member is molded onto the slider member so that it can be deflected resiliently upwards. The jaw member also has an axis 504 about which is hinged a second jaw or clamping member 506 which, in the rest position, has been pressed downwards on the side of the separator remote from the pile by running onto an actuator curve 522 against the bias of a spring 508

If the slider member is then pulled out of the housing, the retentive coating transports the topmost sheet 188 of the pile, which is held against it by the spring assembly 400, over the separator bar. At the same time, the second jaw member 506 comes free of the bar 20 and closes under the action of the biasing spring 508 until the sheet transported by the retentive coating is firmly held between the jaws of the pincer-like arrangement When the slider member is pushed back, the edge of the sheet 188 facing the separator arrives in front of the base-side through gap 310 of the separating means and the pincer-like arrangement pushes it through this through gap until the pincer-like arrangement is opened again by means of the actuator curve 522 So that the retentive coating does not trail over the upper side of the separator bar, when the first jaw member runs over the bar, the jaw member is conveyed along a guide channel 524 past the bar and then springs back into the working position.

The second jaw member can also be provided with a retentive coating 26, but then the side of the separator bar facing it is to be provided with a deep groove, shown by a broken line, so that in this case also no direct contact with the retentive coating can occur.

FIGS. 20 and 22 show in a longitudinal sectional view the rest state and the partially withdrawn state of an apparatus according to the invention in which the first frame part is formed by a housing 12 and the second by a slider member 14. A spring arrangement 24/32 and the separator bar 20 as separating means can be seen.

At the start of the withdrawal travel of the slider member, the feeding means guides the lowest sheet 188 in the housing through beneath the separator bar, behind which a pivotable jaw member 278 is arranged to rotate about a pivot 289. A spring 282 biases the jaw member 278 into the position shown in FIG. 22, as can be seen from the enlarged view according to FIG. 21. The separator bar, with the slider member pushed in, has moved the jaw member into the inactive position as a result of a camming effect when running on. The jaw member may be released automatically on withdrawal, but this is not shown in detail.

FIGS. 23, 24 and 25 show in a schematicised longitudinal section three phases of the withdrawal travel in another embodiment The feeding of the sheet to be separated is effected by means of the transporter, namely the hook-like member 22, which is arranged on the spring arm 24. Housing, slider member and separator bar correspond to the embodiments described previously. The slider member 14 acting as the second frame part, after a certain withdrawal distance, couples itself to a member 284 which is arranged so that it can move longitudinally in the housing 12 forming the first frame part. A recess 286 is provided in the member 284 beneath a guide face 288.

As soon as the transporter, as a result of a first stroke of the slider member, has pushed the leading edge of the sheet 188 being separated through beneath the separator 20, the slider member, now coupled to the member 284, also begins to carry the latter along with it in the withdrawal direction with the result that this edge of the separated sheet goes into the recess 286 and is there firmly clamped by the arm 32 of the spring arrangement. This spring arm forms a jaw member of a pincer-like arrangement, and the edge surface of the recess situated on the other side of the clamped edge of the sheet forms the other jaw member of the pincer-like arrangement This state persists until the rear edge of the separated sheet is freed from the separator. If the slider member is now pushed in again, it takes the member 284 back inwards with it into the housing, and the recess leaves the withdrawn sheet, so that the free arm 32 of the spring arrangement allows the edge of the sheet supported by it to slide smoothly upwards along the guide face 288.

Figure 26:
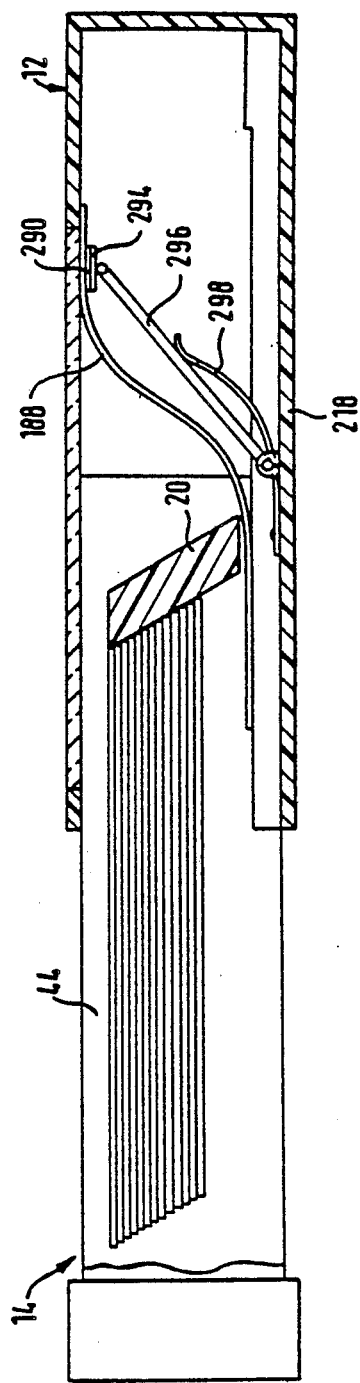

FIG. 26 shows a modification of the pincer-like arrangement: the retentive coating 290 is on a pressing arrangement, consisting of a plate 294 which carries the retentive coating and is articulated on the end of a link 296. The link is connected to the floor 218 of the housing. A spring 298 presses the retentive coating against the separated picture.

Figure 26A:
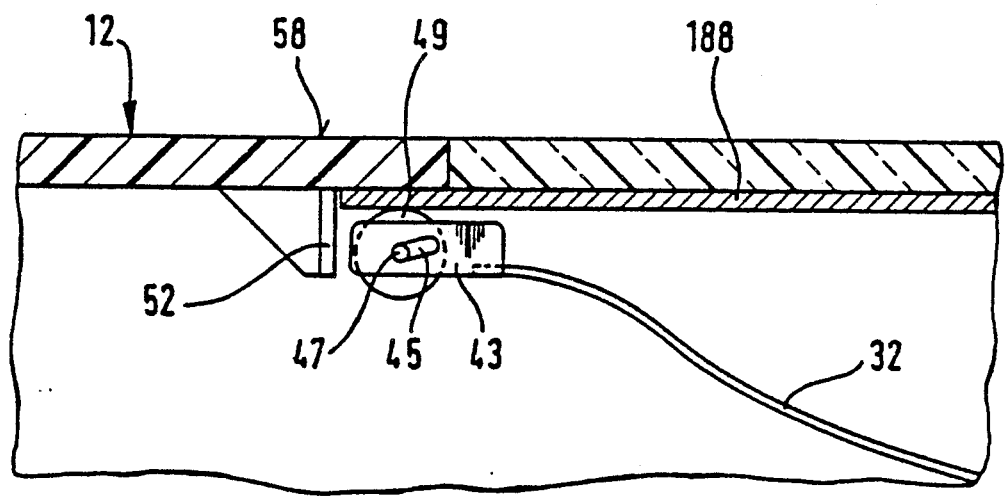
FIG. 26a is a simplified, partial, longitudinal sectional view of another embodiment of the invention.

FIG. 26a shows, to a large extent diagrammatically and on a scale considerably enlarged with respect to FIG. 3, a detail of a modified retaining clamp on the end of the spring arm 32. The two spring arms 32 are provided with lateral tabs 43 in which there is a slot 45. There is accommodated in this slot the axle 47 of a clamping roller 49 which retains the individual sheet 182 the more securely, the more it is pulled (by the separator bar 20), since the slot runs at an angle appropriate to achieve that result.

The described pincer-like retaining means can, as desired, be combined with a feeding means as shown in FIGS. 27 to 47 and explained below.

FIGS. 27 to 34 show the method of operation of the preferred feeding means, and alternative forms and details thereof.

FIGS. 27 and 34 firstly illustrate the principle. In FIG. 27 the first frame part can be seen in the form of the substantially rectangular housing 12 in which the slider member 14 is arranged to slide as the second frame part. The separating means is indicated only symbolically as a separator bar 20. The pile of sheets of like format is indicated by 182.

The slider member 14 comprises a grip part 48, against which rests the front edge of the pile, seen in the direction of movement, and also the two longitudinal side pieces 44 near the separator bar. Between the longitudinal side pieces the members of the feeding means project upwards from the base of the housing 12. The two leaf springs 24 are fixed by one end to the housing; the other end has the inclined face 22 resting against the edge of the pile (see also FIGS. 30, 34). The inclined face is accordingly structurally combined with the bias spring in the springs 24.

If the slider member is now pulled out of the housing, as shown in FIGS. 27 to 34 for the start of the change-over cycle, the inclined face 22, which in the rest state according to FIG. 27 still projects in the region of the grip part 48, then comes to rest against the edge of the pile (FIG. 28). When the slider member is pulled further out of the housing, the topmost sheets in the pile, which are therefore shown as a block, go along with the slider member, while the sheets lying within the field of action of the inclined face are held back until the separator bar 20 meets their opposite edge (FIG. 29).

Pressure is now exerted on the sheets from both edges inwards, on the one hand from the separator bar, and on the other hand from the inclined face of the feeding means. The inclined face can however yield downwards as a result of the resiliency of the springs 24, so that the inclined face slides away on the edges of the sheets lying above the lowest sheet, one edge after the other. On the other hand, only a substantially lower retaining force, or none at all, acts on the lowest sheet from the separator bar, so that with the inclined position of the inclined face 22 and the bias of the springs 24 correctly matched, the force applied by the component of the spring bias which acts in the longitudinal direction of the sheets is sufficient to push the lowest sheet through beneath the separator bar. The adhesive force acting between adjacent sheets, which is an important consideration in the design of the system, is also overcome here.

Figure 35:
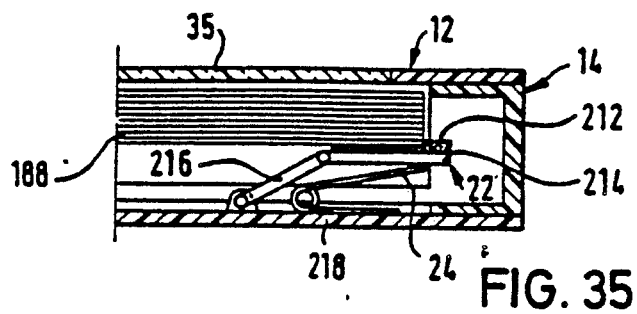
FIG. 35 is a simplified, partial, longitudinal sectional view of another embodiment of the invention.
Figure 36:
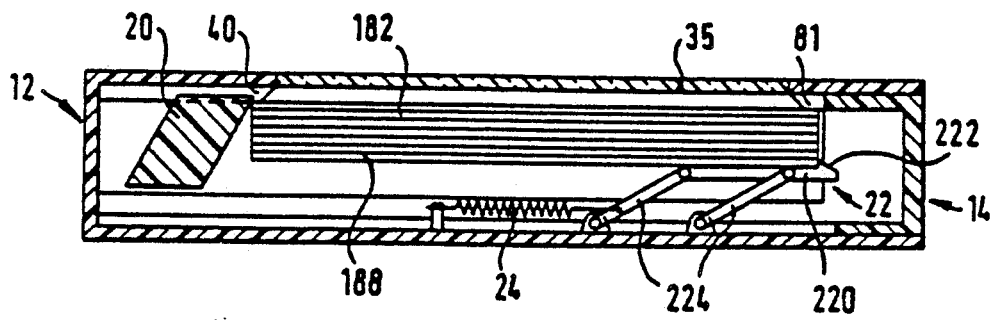
FIG. 36 is a simplified longitudinal sectional view of another embodiment of the invention.
Figure 37:
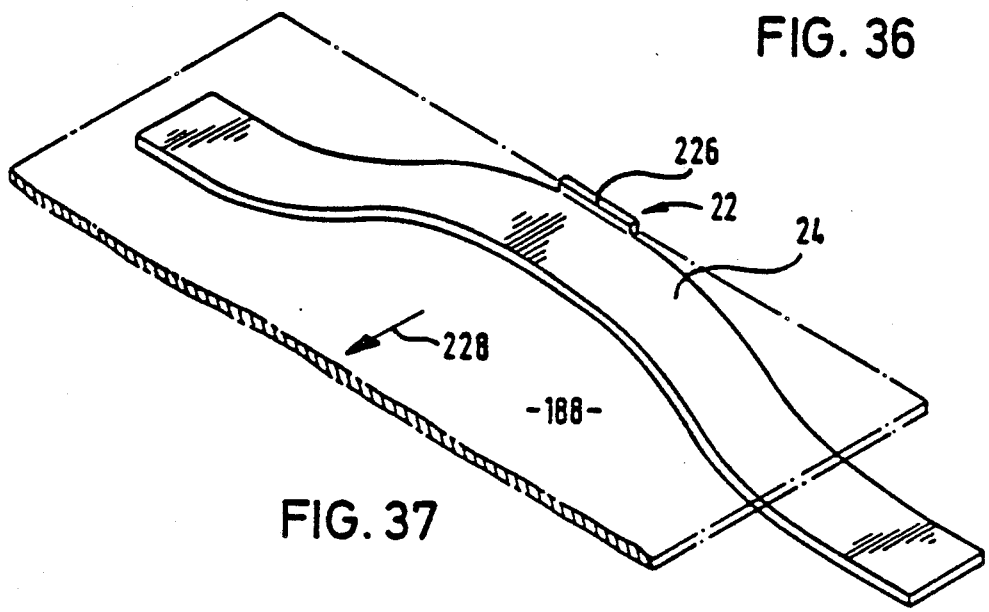
FIG. 37 is a simplified perspective view of a component which can be used, for example, in embodiments like the one shown in FIG. 36.

FIGS. 35, 36 and 37 show further designs of feed systems.

In FIG. 35 the transporter 22 comprises a compressible layer 212 on a carrier plate 214 which is connected by means of links 216 to the floor 218 of one of the frame parts. A coiled torsion spring 24 presses the transporter against the rear edge of the sheet 188 which is to be separated.

According to FIG. 36, the transporter 22 is in the form of a plate 220 which engages with an upwardly projecting edge 222 behind the rear edge of the sheet 188 which is to be separated. The bias arrangement comprises a helical tension spring 24 which is anchored to a fixed point and engages with a parallelogram linkage mechanism 224 to which the transporter plate is linked. In this way the transporter is held independently of the thickness of the pile parallel to its principal plane.

According to FIG. 37, the transporter 22 is a projection 226, protruding from a leaf spring 24 which extends transversely to the direction of movement of the sheet 188 being separated, symbolized by means of the arrow 228; here again, the transporter is substantially always in the same working position with respect to the edge of the sheet, independently of the number of sheets in the pile.

FIGS. 38 to 47 show, to a large extent diagrammatically, further different feed systems based on different principles.

Figure 38:
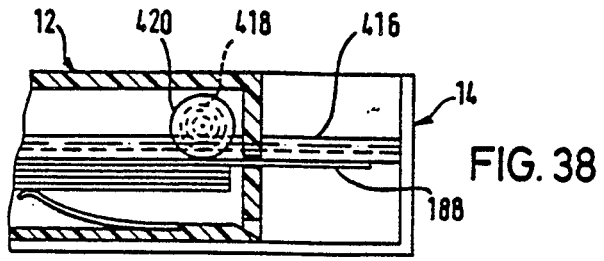
FIG. 38 is a simplified, partial, longitudinal sectional view of another embodiment of the invention.

According to FIG. 38, the first frame part has a molded toothed rack 416 with which a pinion 418 rotatably mounted in the second frame part engages and, during the relative movement, drives a transporter roller 420 which frictionally engages the sheet 188 to be separated and transports it.

Figure 39:
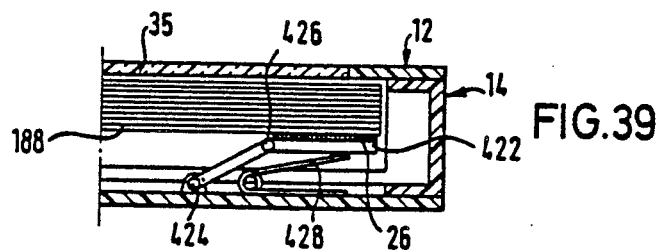
FIG. 39 is a simplified, partial, longitudinal sectional view of another embodiment of the invention.

FIG. 39 shows an embodiment having a plate 422 which has a retentive layer 26 which is able to engage frictionally and transport the sheet lying against it. The level arrangement is ensured by the mounting of the plate by means of a first pivot 424 and a second pivot 426 and a biasing spring, in this case a coiled torsion spring 428 with projecting ends.

Figure 40:
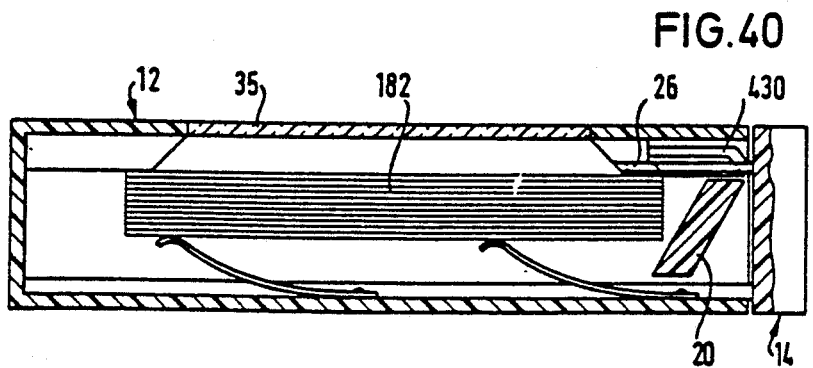
FIG. 40 is a simplified longitudinal sectional view of another embodiment of the invention.

FIG. 40 shows an embodiment in which the feeding means also functions by means of a transporter with retentive means. In this case the first frame part is designed as a slider member and the second frame part as a housing. There is arranged on the slider member 14 a transporter with retentive means 26 which draws off the sheet to be separated from the pile 182 and conveys it to the separating means which is indicated here simply as a separator bar 20. In the second frame part (that is the housing 12) there is formed a control channel 430 along which the transporter with retentive means is guided away over the separator bar without coming into contact with the latter.

Figure 41:
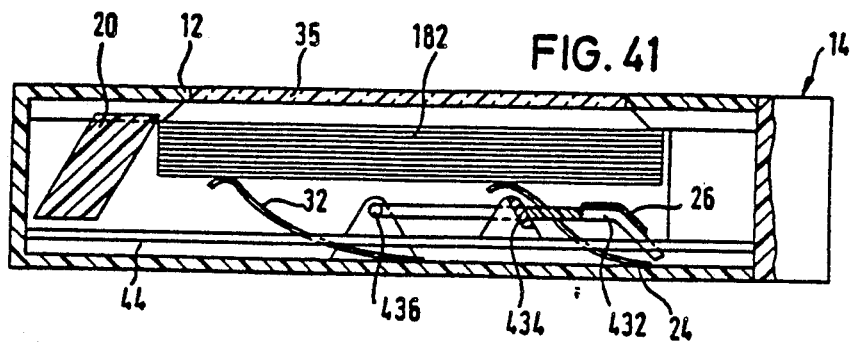
FIG. 41 is a simplified longitudinal sectional view of another embodiment of the invention.

FIG. 41 shows how a transporter with retentive means 26, arranged near the distal end of a lever 432, by running up an actuator slope 434 on the second frame part (slider member 14), is pivoted about its pivot 436 on the first frame part (housing 12) to lie against the sheet of the pile facing it and in this manner, during a part of the travel of the relative movement of the parts, conveys this sheet to the separating means, symbolized by the separator bar 20.

Figure 42:
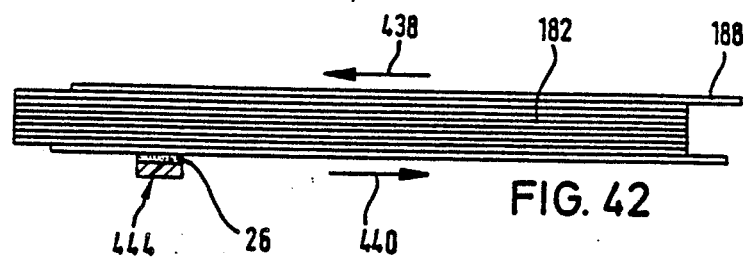
FIG. 42 is a diagrammatic side view.
Figure 43:
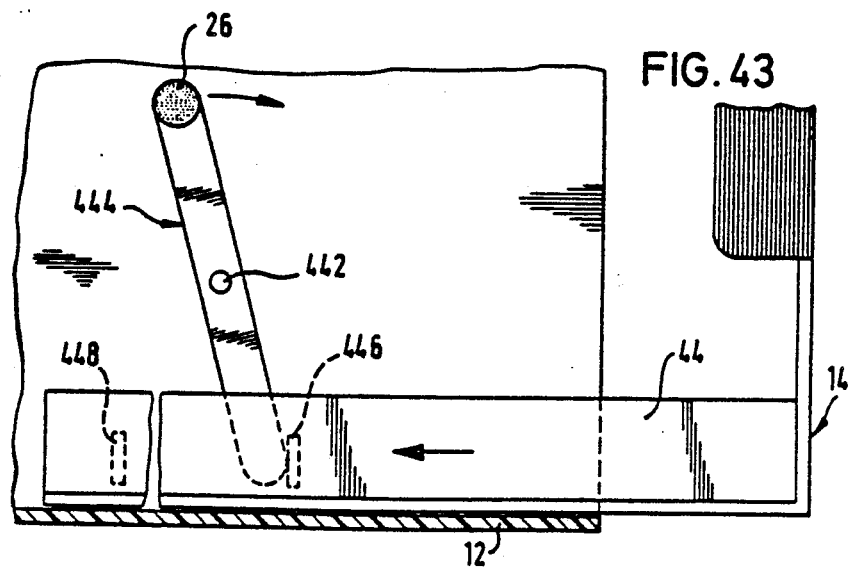
FIG. 43 is a plan view of a partial section, illustrating another embodiment of the invention.

FIG. 42 shows in a diagrammatic side view, and FIG. 43 shows in a plan view of a partial section, a feeding means which is effective not just at the beginning of outward travel of the frame parts, but is effective already during the last part of the inward travel of the previous change operation.

While the individual sheet 188 is being conveyed back to one end of the pile 182 (arrow 438), on the other end of the pile (arrow 440) the next sheet is already in motion. For this purpose, the first frame part has a lever 444 which is hinged at 442 and has a transporter with retentive means 26, which lever, by running against stops 446 and 448, is reset near each relative end position of the second frame part and transports the sheet according to the relative movement of the two frame parts.

FIG. 44 shows in diagrammatic longitudinal section a final feed system, while FIGS. 45 to 46 show individual phases of the change cycle. FIG. 47 illustrates the drive of the roller.

FIG. 44 shows the first frame part in the form of a slider member 14 which can be displaced relative to the second frame part which is designed as a housing 12. The separating means comprises the separator bar 20 and further components according to FIGS. 1 to 5. The springs 400 press the pile 182 upwards.

There is molded on the slider member a toothed rack 416 (FIG. 47) which engages with a pinion on the roller shaft (not shown). As a result the drive to the roller is at a peripheral speed which is equal to the relative speed between the two frame parts. The roller 420 is provided with a coating increasing the friction with the photos and since the pile is pressed by the springs against the roller, then, when the slider member is pulled out of the housing, the roller conveys the sheet facing it a distance through the through gap 244 between the separator bar and the housing top wall 266. The roller can be rotated in mountings of the housing.

There is provided on the slider member a transporter element having a retentive coating 26 which, in cooperation with a cooperating element 450, grips the leading edge of the sheet conveyed by the roller as soon as the cooperating element, which has first been tilted away downwards by running onto the separator bar, escapes from this bar and, under the action of a biasing spring (not shown) pivots upwards onto the retentive coating. The sheet is then held between the retentive coating and the cooperating element in a pincer-like manner. The roller accordingly works as feeding means and the described pincer-like arrangement as retaining means.

As can be seen in FIG. 46, during the return travel of the slider member, the individual sheet 188 runs through the lower through gap 310 of the separator bar and an actuating member 452 folds the cooperating element down at the right moment so that the trailing edge of the sheet is released to run through the through gap.

I claim:

1. An apparatus for cyclic rearrangement of a stack of substantially rectangular sheets, the apparatus comprising a first frame part and a second frame part which is reciprocable relative to said first frame part in a predetermined direction between an inner end position and an outer end position, the apparatus further comprising means for removing, upon an outward stroke of said second frame part from said inner end position toward said outer end position, an individual sheet from one end of said stack leaving at least one remaining sheet and for adding said individual sheet to the other end of said stack upon an inward stroke of said second frame part from said outer end position toward said inner end position, said individual sheet having a first side facing said at least one remaining sheet prior to a reciprocation and a second side opposite said first side and facing said at least one remaining sheet after said reciprocation, said means including:

means for separating said individual sheet from said stack,
means for feeding said individual sheet to said separating means,
first means for retaining said individual sheet in said first frame part,
second means for retaining said at least one remaining sheet in said second frame part, and
means for transferring said individual sheet from a first level defined by said one stack end to a second level defined by said other stack end, and wherein said first retaining means includes a pincer device comprised of a first pincer member which is displaceable relative to said individual sheet so as to engage its first side and press its second side against a second pincer member mounted on said first frame part, and including means for controlling displacement of said first pincer member in response to relative movement of said frame parts.

2. The apparatus of claim 1 wherein a sheet-contacting surface of at least one of said pincer members has a friction-increasing coating.

3. The apparatus of claim 1 wherein said first pincer member is pivotable.

4. The apparatus of claim 3 wherein said first pincer member is pivotable about an axis extending substantially orthogonal with respect to said predetermined direction.

5. The apparatus of claim 1 wherein said first pincer member includes a rigid jaw.

6. The apparatus of claim 1 wherein said first pincer member includes an elastic element.

7. The apparatus of claim 1 wherein said second pincer member is a part of said first frame part.

8. The apparatus of claim 7 wherein said second pincer member is a wall of said first frame part.

9. The apparatus of claim 1 including spring means for biasing said pincer device into one of its sheet-engaging and sheet-disengaging positions.

10. The apparatus of claim 9 wherein said first pincer member is spring-biased.

11. The apparatus of claim 10 wherein said first pincer member is spring-biased into its sheet-engaging position.

12. The apparatus of claim 9 wherein said pincer device is spring-biased into its sheet-engaging position and may be moved into its sheet-disengaging position against said spring bias by said controlling means.

13. The apparatus of claim 1 wherein said controlling means are mounted on said second frame part.

14. The apparatus of claim 13 wherein said controlling means include a cam track.

15. The apparatus of claim 1 wherein said controlling means include a control member displaceable relative to said first and relative to said second frame parts.

16. The apparatus of claim 1 wherein said pincer device is designed and arranged to displace an end of said individual sheet into a predetermined position for said inward stroke of said second frame part.

17. The apparatus of claim 16 wherein said pincer device forms an element of said transferring means and guides said end of said individual sheet substantially orthogonally with respect to said predetermined direction.

18. The apparatus of claim 16 wherein said pincer device forms stop means for positioning said individual sheet.

19. The apparatus of claim 1 wherein said pincer device engages said individual sheet adjacent one edge thereof which extends transverse to said predetermined direction.

20. The apparatus of claim 19 wherein said pincer device engages at least two points adjacent said edge.

21. The apparatus of claim 19 wherein said edge is a leading edge of said individual sheet with respect to its displacement relative to said at least one remaining sheet, and said pincer device engaging said leading edge after its having passed said second retaining means.

22. The apparatus of claim 1 wherein said pincer device engages said individual sheet adjacent at least one edge which extends in said predetermined direction.

23. The apparatus of claim 1 wherein said pincer device retains said individual sheet over the entire outward stroke of said second frame part.

24. The apparatus of claim 1 wherein said pincer device disengages from said individual sheet only after a predetermined portion of said inward stroke of said second frame part.

25. The apparatus of claim 1 wherein an element of said pincer device is also an element of said feeding means.

26. The apparatus of claim 25 wherein said feeding means include a retentive element engaging said second side of said individual sheet.

27. The apparatus of claim 26 wherein said retentive element is disposed on said second pincer member.

28. The apparatus of claim 1 wherein said feeding means include a transporter engaging said individual sheet at a trailing edge which extends transverse to said predetermined direction.

29. The apparatus of claim 1 wherein said pincer device includes a wedge element for frictionally retaining said individual sheet.

30. The apparatus of claim 29 wherein said wedge element includes a roller journalled in slots.

31. The apparatus of claim 1 wherein one of said frame parts is a housing having a display window, and the other frame part is adapted to be withdrawn from said housing as a slider.

32. The apparatus of claim 31 wherein said first frame part is the housing and said second frame part is the slider.

33. The apparatus of claim 32 wherein said individual sheet is the one remote from said display window when said slider assumes its inner end position.

34. The apparatus of claim 1 wherein said second pincer member is displaceably mounted on said first frame part.

35. The apparatus of claim 34 wherein said second pincer member is spring-biased into an end position.

36. The apparatus of claim 1 wherein said pincer member is slideably mounted in said first frame part.

37. The apparatus of claim 36 wherein said first pincer member is slidable in said predetermined direction.

* * * * *